United States Patent
Le Strat et al.

(10) Patent No.: US 10,415,424 B2
(45) Date of Patent: Sep. 17, 2019

(54) BALANCED TURBINE ENGINE PORTION AND TURBINE ENGINE

(71) Applicant: SNECMA, Paris (FR)

(72) Inventors: Jean-Luc Le Strat, Saint Michel sur Orge (FR); Herve Pohier, La Queue en Brie (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 459 days.

(21) Appl. No.: 15/037,549

(22) PCT Filed: Nov. 24, 2014

(86) PCT No.: PCT/FR2014/053011
§ 371 (c)(1),
(2) Date: May 18, 2016

(87) PCT Pub. No.: WO2015/079150
PCT Pub. Date: Jun. 4, 2015

(65) Prior Publication Data
US 2016/0290156 A1  Oct. 6, 2016

(30) Foreign Application Priority Data
Nov. 26, 2013  (FR) .................... 13 61640

(51) Int. Cl.
*F01D 25/04* (2006.01)
*F01D 9/02* (2006.01)
(Continued)

(52) U.S. Cl.
CPC ............. *F01D 25/04* (2013.01); *F01D 5/027* (2013.01); *F01D 9/02* (2013.01); *F02C 7/04* (2013.01);
(Continued)

(58) Field of Classification Search
CPC ........ F01D 25/04; F01D 25/027; F16F 15/32; F16F 15/34; G01M 1/36
See application file for complete search history.

(56) References Cited

U.S. PATENT DOCUMENTS

| | | | |
|---|---|---|---|
| 5,011,374 A * | 4/1991 | Miller .................... | F01D 5/027 416/144 |
| 8,529,204 B2 * | 9/2013 | Bagnall ................... | F01D 5/066 415/218.1 |

(Continued)

FOREIGN PATENT DOCUMENTS

| | | |
|---|---|---|
| EP | 1 441 108 A2 | 2/2009 |
| EP | 2 028 375 A2 | 2/2009 |
| FR | 2 980 240 A1 | 3/2013 |

OTHER PUBLICATIONS

International Search Report dated Feb. 24, 2015, in PCT/FR2014/053011 Filed Nov. 24, 2014.

(Continued)

*Primary Examiner* — Richard A Edgar
*Assistant Examiner* — Brian O Peters
(74) *Attorney, Agent, or Firm* — Oblon, McClelland, Maier & Neustadt, L.L.P.

(57) ABSTRACT

A balanced turbomachine part including one angular sector arranged to form a balancing ring centered about a ring axis. The angular sector includes a plurality of fasteners, a bearing face having a complementary shape to the balancing ring, the angular sector bearing on the bearing face. The part further includes a plurality of balancing masses each fastened to the corresponding fastener of the angular sector, at least one of the balancing masses also acting as a fastener for fastening the angular sector on the bearing face.

13 Claims, 2 Drawing Sheets

(51) Int. Cl.
*F02C 7/04* (2006.01)
*F01D 5/02* (2006.01)
*G01M 1/36* (2006.01)
*F16F 15/34* (2006.01)

(52) U.S. Cl.
CPC .............. *F16F 15/34* (2013.01); *G01M 1/36* (2013.01); *F05D 2230/60* (2013.01); *F05D 2250/232* (2013.01); *F05D 2260/96* (2013.01)

(56) References Cited

U.S. PATENT DOCUMENTS

| | | | |
|---|---|---|---|
| 9,410,431 B2* | 8/2016 | Bottome | F01D 5/066 |
| 2004/0145251 A1 | 7/2004 | Clouse et al. | |
| 2009/0087313 A1 | 4/2009 | Belmonte et al. | |
| 2011/0223008 A1 | 9/2011 | Belmonte et al. | |
| 2012/0134843 A1* | 5/2012 | Bottome | F01D 5/066 |
| | | | 416/245 R |
| 2012/0151937 A1 | 6/2012 | Muscat et al. | |
| 2015/0315914 A1* | 11/2015 | Nicq | F16F 15/32 |
| | | | 416/144 |

OTHER PUBLICATIONS

French Search Report dated Mar. 26, 2014, in FR 13 61640 Filed Nov. 26, 2013.

\* cited by examiner

BALANCED TURBINE ENGINE PORTION AND TURBINE ENGINE

TECHNICAL FIELD

The invention relates to the field of turbomachines and balancing some turbomachine parts.

STATE OF PRIOR ART

The turbomachines have, by definition, pieces rotating at relatively high speeds. These high rotation speeds can cause significant vibrations of some turbomachine parts, wherein these vibrations can, in the short or medium term, damage said parts. Therefore, it is necessary to balance said parts in order to limit the amplitude of these vibrations.

Thus, it is known to provide on these turbomachine parts to be balanced, the fastening of balancing masses the distribution of which is suitable for balancing said parts.

To provide such an fastening, the turbomachine part to be balanced includes a crimping groove adapted to receive nuts and the nuts can be crimped in this groove. The balancing masses take the form of balancing screws the mass of which is adapted by modifying the length.

Upon balancing such a turbomachine part, the nuts are first crimped one by one in the crimping groove with a predetermined angular distribution. The screws are then mounted on the different nuts, the mass of each of the screws being suitably chosen to balance said part.

If such a nut-balancing screw distribution system in a crimping groove enables the turbomachine part to be balanced to be accurately balanced, it has however a number of drawbacks. Indeed, the step of crimping the nuts has to be accurate and requires an adapted tooling. As a result, this step is tedious to implement, has considerable damage risks for the piece to be balanced and has a significant influence on the manufacturing time of a turbomachine. This same system is not particularly adapted for maintenance operations either. Indeed, any repair or nut change operation requires that the entire turbomachine part is moved to an adapted workshop.

This problem is applicable in particular to the turbomachine part which is the turbomachine inlet cone. Indeed, this part is made of aluminum and thus has a high damage risk upon crimping and dismounting the nuts for fastening balancing screws.

DISCLOSURE OF THE INVENTION

The invention aims at overcoming these drawbacks.

Thus, one of the purposes of the invention is to provide a balanced turbomachine part with a system for fastening balancing masses including fasteners, such as nuts, without the balancing requiring a heavy crimping step for these fasteners.

Another purpose of the invention is to provide a turbomachine part to be balanced with a system for fastening balancing masses including fasteners, such as nuts, said system enabling fasteners to be more easily positioned towards with respect to the turbomachine part.

To that end, the invention relates to a balanced turbomachine part including:
  at least one angular sector arranged to form a balancing ring centered about a ring axis, said angular sector including a plurality of fasteners each adapted to fasten at least one respective balancing mass, said fasteners each including a threading axis, all the threading axes substantially converging at a same point on the ring axis,
  a bearing face having a shape complementary to the balancing ring, the angular sector bearing on said bearing face,
  a plurality of balancing masses each fastened to the corresponding fastener of the angular sector, at least one of the balancing masses also acting as an fastening means for fastening the angular sector to the bearing face.

Such an angular sector of a balancing ring enables the plurality of fasteners of this angular sector to be positioned at a time. Thus, this enable for the technician the tedious task of having to position these same fasteners individually in a cumbersome way. This is especially time that for a balancing ring formed by several angular sectors, only the accurate positioning of the first sector is necessary, the positioning accuracy of the other angular sectors being achieved by placing the same with respect to the first angular sector.

Furthermore, a turbomachine being a revolution machine, the ring shape allows for an easy placing and holding in place of the angular sectors. It is thus not necessary to have a heavy crimping operation as is the case in balancing methods of prior art. These placing and holding in place without crimping limit the damage risks of the turbomachine part upon balancing. The maintenance operations of the same turbomachine part are also facilitated since it is not necessary to uncrimp the fasteners one by one.

The angle of the angular sector can be between 20° and 360°.

The threading axis of each of the fasteners can form a maximum angle with respect to the radial direction of the angular sector which is lower than 50°, preferentially lower than 30° and further preferentially lower than 15°.

The threading axis of each of the fasteners can be substantially radially oriented with respect to the angular sector.

The angular sector can be intended to form a balancing ring having a frustro-conical or cylindrical revolution shape.

The fasteners can be substantially evenly distributed along the angular sector.

The turbomachine part can be a turbomachine inlet cone.

Such a turbomachine part, in particular because it can be made of aluminum and can thus have significant damage risks upon balancing according to a method of prior art, particularly benefits from such a configuration.

The invention further relates to a method for balancing a turbomachine part including a bearing face, said method comprising the following steps of:
  providing at least one angular sector according to the invention,
    bringing the angular sector to bear on the bearing face of the turbomachine part to be balanced so as to form the balancing ring,
    fastening at least one balancing mass on one of the fasteners of the angular sector so as to fasten the angular sector and to balance said turbomachine part.

Such a balancing method enable a balanced turbomachine part to be provided which allows facilitated maintenance operations compared to a balanced turbomachine part according to a method of prior art.

The invention also relates to a turbomachine including at least one balanced turbomachine part according to the invention.

Such a turbomachine allows facilitated maintenance operations as regards the balanced turbomachine part with respect to a turbomachine including a balanced turbomachine part according to a method of prior art.

BRIEF DESCRIPTION OF THE DRAWINGS

The present invention will be better understood upon reading the description of exemplary embodiments, given by way of purely indicating and in no way limiting purposes, with reference to the appended drawings in which.

Identical, similar or equivalent parts of the different figures bear the same reference numerals so as to facilitate switching from one figure to the other.

Different parts represented in the figures are not necessary drawn to a uniform scale, for making the figures more understandable.

DETAILED DISCLOSURE OF PARTICULAR EMBODIMENTS

Figure 1:
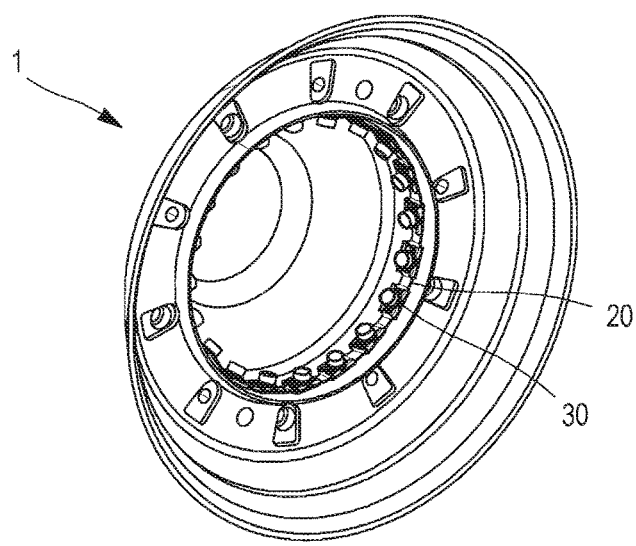
FIG. 1 illustrates an inlet cone of a turbomachine which is equipped with angular sectors of a balancing ring according to the invention, FIGS. 2a and 2b respectively illustrate a balancing ring as illustrated in FIG. 1 and an angular sector forming such a balancing ring.

FIG. 1 illustrates a turbomachine inlet cone 1 equipped with a balancing ring 20 including a plurality of nuts 30 for fastening corresponding balancing screws 40, not illustrated in FIG. 1.

Figure 2A:
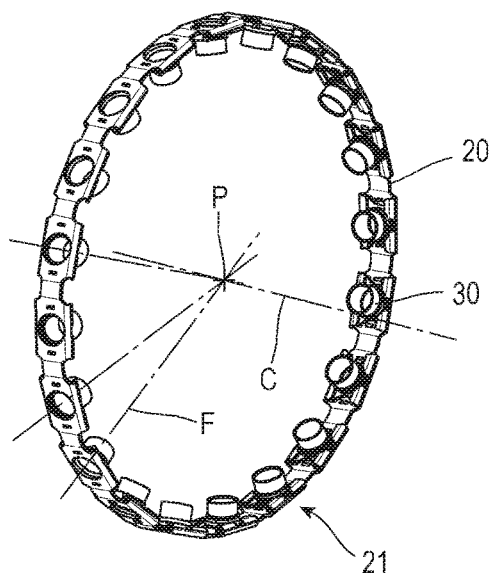

Such a balancing ring 20 is as illustrated in FIG. 2a, in the form of a strip the two ends of which are joined to have a substantially circular transverse cross-section. The balancing ring 20 thus has a substantially cylindrical revolution shape the height of which is in the same order of magnitude as the width of a nut 30. According to other possibilities of the invention, which are not illustrated, the balancing ring 20 can have a revolution shape other than a cylindrical one, such as a frustro-conical shape. The balancing ring 20 is centered about a ring axis (C).

Figure 2B:
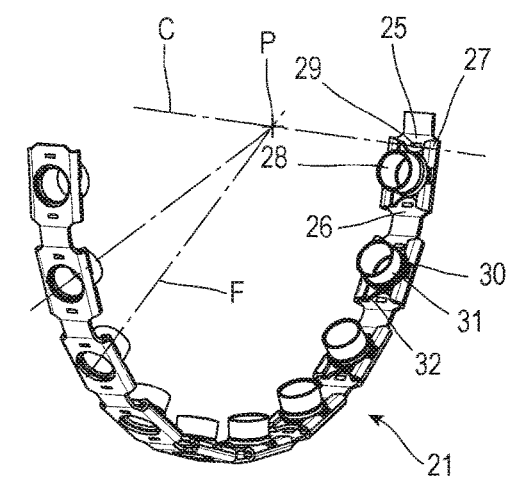

The balancing ring 20, as illustrated in FIG. 2b, can be formed from one or more angular sectors 21 having an angle between 20° and 360°. According to a preferred configuration illustrated in FIG. 2b, the balancing ring 20 is preferentially formed by two angular sectors 21 having an angle equal to 180°.

According to a first possibility, the angular sectors 21 are free of a mounting system for assembling them to each other, and are thus adapted to form the balancing ring 20 by a simple side by side mounting upon installation on the inlet cone 1. According to a second possibility, the angular sectors 21 each have at least one fastening means adapted to cooperate with a complementary fastening means of a directly adjacent angular sector. According to this second possibility, the assembly of the angular sectors 21 to form the balancing ring 20 can occur prior to installation on the inlet cone 1 or at the same time as the assembly on the inlet cone 1. The balancing method which is described hereinafter is adapted for the first possibility in which the angular sectors 21 do not include a mounting system to assemble them to each other, and thus in which the balancing ring 20 is formed by a simple side by side mounting of the angular sectors 21.

Figure 3:
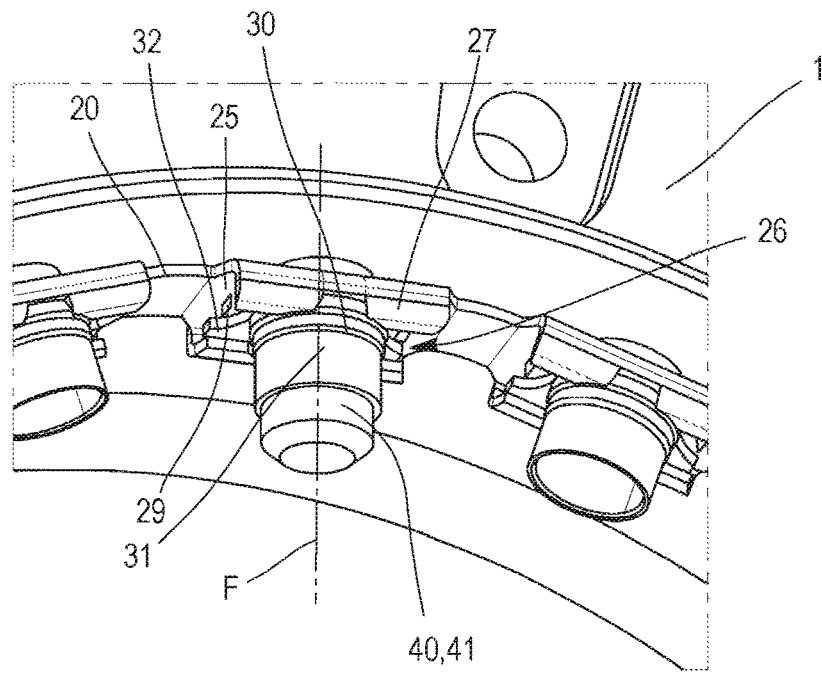
FIG. 3 illustrates a close-up view of the inlet cone illustrated in FIG. 1 enabling the ring fastening to be shown by means of a balancing screw.

The balancing ring 20 includes, along its perimeter and as shown in FIG. 3, a plurality of nut locations 25. The nut locations 25 are substantially evenly distributed along the balancing ring 20.

Each of the nut locations 25 includes a through hole 28, suitable for passing the shank of a balancing screw 40 therethrough, and a system for mounting a nut 30 adapted for mounting the nut 30 by rotationally locking it.

The mounting system includes a portion 26 of balancing ring 20 forming a nut support. This portion 26 is in the form of a side flare of the balancing ring 20 such that the balancing ring 20 includes, at this portion 26, a width lager than that of a nut 30. The balancing ring 20 is thus adapted to support a nut 30 at each nut location 25 formed on a portion 26. Each portion 26 has two side extensions 27 extending radially from the portion 26 towards the portion inside of the balancing ring 20 and then toward one another. These side extensions 27 thus have L shaped side cross-sections which enable the nut 30 to be supported when it is placed onto the corresponding portion 26 of the balancing ring 20.

The mounting system also includes two outgrowths 29, adapted to form stops, both extending on either side of the corresponding portion 26 towards the inside of the balancing ring 20. The outgrowths 29 can consist for example of tabs formed by cut outs provided in the balancing ring 20, which are curved by punching to form the outgrowths 29 once the nut 30 is put in place.

Thus, once a nut 30 is provided in the corresponding location of the ring, it is held in place by the mounting system with both side extensions 27 which rotationally lock it and both outgrowths 29 which hold it in place in the peripheral direction of the balancing ring 20. Advantageously, at least one outgrowth 29 can be retractable, for example by flattening the tab forming it. This enables the holding in place of the corresponding nut 30 to be unlocked, and enables the nut to be moved in the peripheral direction to disengage it from the side extensions 27 and pull it away from the balancing ring 20. Thus, such mounting systems enable a removable mounting of the nuts 30 on the balancing ring 20 while contributing a holding meeting safety requirements related to the installation on a turbomachine.

Each of the nuts 30, as illustrated in FIG. 3, includes a platen 32 adapted to cooperate with the mounting system and including a through aperture for passing the shank 41 of a balancing screw 40 therethrough. The aperture is provided on the platen 32 such that it corresponds to the through hole 28 of the location 25 when the nut 30 is mounted on a location of the balancing ring 20. The platen 32 includes a first face which bears on the ring portion when the nut is positioned on a mounting system, and a second face having side edges able to rest on the L shaped side sections of the side extensions 27.

The through aperture of a platen 32 is extended by a sleeve 31 which extends substantially perpendicular from the platen 32 from its second face. The sleeve 31 is a hollow cylindrical revolution shaped threaded sleeve. The threading axis F of the sleeve 31, thus corresponding to the threading axis F of the nut, is oriented substantially perpendicularly to the plane along which the platen 32 extends.

Thus, with such a configuration of the nut 30, when the same is mounted on a location of the balancing ring 20, the threading axis F of the nut 30 becomes radially oriented with respect to the balancing ring. When all the locations 25 are occupied by nuts 30, as is illustrated in FIG. 2a, the threading axes F of the nuts 30 converge on the ring axis C of the balancing ring 20 at a same point P.

Each of the nuts 30 forms a threaded fastener adapted to fasten a balancing screw 40, that is a balancing mass.

Figure 4:
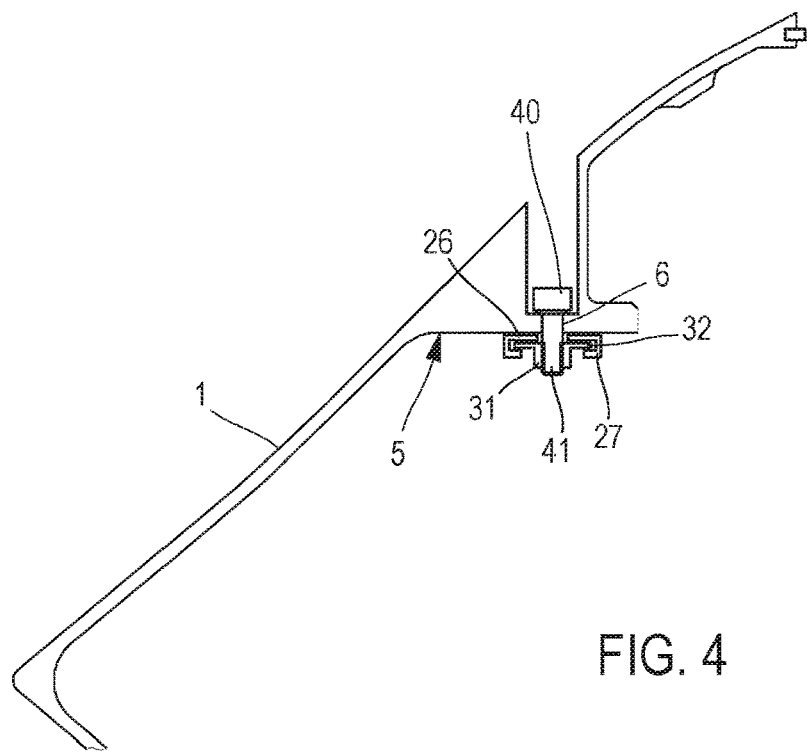
FIG. 4 illustrates a cross-section of the cone illustrated in FIG. 1.

The turbomachine inlet cone 1 forms part of the turbomachine which is to be balanced. In order to allow for a balancing by means of a balancing ring 20, the inlet cone 1 includes, as shown in the cross-section view illustrated by FIG. 4, the inner bearing face 5. The bearing face 5 has a shape complementary to the balancing ring 20. The inlet cone 1 also includes, at this bearing face 5, a plurality of openings 6 communicating the outside of the inlet cone 1 with the bearing face 5. The number of these openings 6 and their arrangement along the bearing face 5 are adapted to match that of the through holes of the ring 20.

The balancing of such an inlet cone 1 can be made by means of a balancing method comprising the following steps of:
- placing a first angular sector 21 bearing on the bearing face 5 of the inlet cone 1, the through holes 28 being each positioned facing an opening 6 of the bearing face 5 of the inlet cone 1,
- installing at least one balancing screw 40 in order to define the positioning of this first angular sector 21, the shank 41 of the balancing screw 40 passing through the opening 6 and being screwed in a corresponding nut 30 of said angular sector 21,
- positioning the other angular sector with respect to the first angular sector 21 on the bearing face 5 of the inlet cone 1,
- installing at least one second balancing screw 40, so as to fasten the second angular sector,
- installing the other balancing screws 40, the mass of these other balancing screws 40 being selected so as to balance the inlet cone 1.

The above-described method relates to a balancing ring 20 which is formed by two angular sectors assembled upon positioning on the inlet cone. Of course, the steps of such a method are perfectly adaptable to a balancing ring including a single angular sector or which is formed by angular sectors assembled prior to installing on the inlet cone. Such an adapted method thus includes a prior step of providing the balancing ring 20, either directly by an angular sector of 360°, or the assembly of the angular sectors 21 to each other them to form the balancing ring 20. In this same method, the step of placing the angular sector is replaced by a step of placing the balancing ring 20 and the steps of positioning the other sector and installing the second balancing screw are not performed, because they are no longer necessary.

In the above described balancing method, the balancing ring 20 includes two angular sectors of 180°, it can however include a different number of angular sectors without departing from the scope of the invention. Thus, for example, the balancing ring can include a single angular sector of 360°, four angular sectors of 90° each, or even 3 angular sectors, two being of 90° and another of 180°.

In the embodiment described above, the nuts are fastened to the balancing ring. According to this possibility, a change of nut requires its total removal it from the balancing ring, or as the case may be, from the angular sector including it. However, it is contemplatable, without departing from the scope of the invention, that part or all of the nuts are removably mounted on the ring, for example by providing means for removably snap-fitting the nut platen on the ring.

The invention claimed is:

1. A balanced turbomachine part comprising:
   at least one angular sector arranged to form a balancing ring centered about a ring axis, the angular sector including a plurality of fasteners each adapted to fasten at least one respective balancing mass, the fasteners each including a threading axis, all the threading axes substantially converging at a same point on the ring axis;
   a bearing face having a shape complementary to the balancing ring, the angular sector bearing on the bearing face; and
   a plurality of balancing masses each fastened to the corresponding fastener of the angular sector, at least one of the balancing masses also acting as a fastener for fastening the angular sector to the bearing face,
   wherein the fasteners are nuts, and the balancing masses are screws,
   wherein a perimeter of the balancing ring includes a plurality of nut locations substantially evenly distributed along the balancing ring, each of the nut locations including a through hole and a mounting system for mounting the nut, and
   wherein the mounting system includes a portion of the balancing ring in a form of a side flare forming a nut support, a width of the nut support being greater than a width of the nut, the nut support including two side extensions presenting an L-shaped cross section.

2. The balanced turbomachine part according to claim 1, wherein the angle of the angular sector is between 20° and 360°.

3. The balanced turbomachine part according to claim 1, wherein the threading axis of each of the fasteners is substantially radially oriented with respect to the angular sector.

4. The balanced turbomachine part according to claim 1, wherein each fastener is held in place by side extensions crimped by folding.

5. The balanced turbomachine part according to claim 1, wherein the balancing ring has a cylindrical or frustro-conical revolution shape.

6. The balanced turbomachine part according to claim 1, wherein the fasteners are substantially evenly distributed along the angular sector.

7. The balanced turbomachine part according to claim 1, wherein the turbomachine part is a turbomachine inlet cone.

8. A method for balancing a turbomachine part comprising a bearing face, the method comprising:
   providing at least one angular sector for forming a balancing ring centered about a ring axis, the angular sector including a plurality of fasteners each adapted to fasten at least one respective balancing mass, the fasteners each including a threading axis, all the threading axes substantially converging at a same point on the ring axis;
   bringing the angular sector to bear on the bearing face of the turbomachine part to be balanced so as to form a balancing ring; and
   fastening at least one balancing mass on one of the fasteners of the angular sector so as to fasten the angular sector and to balance the turbomachine part,
   wherein the fasteners are nuts, and the balancing masses are screws,
   wherein a perimeter of the balancing ring includes a plurality of nut locations substantially evenly distributed along the balancing ring, each of the nut locations including a through hole and a mounting system for mounting the nut, and
   wherein the mounting system includes a portion of the balancing ring in a form of a side flare forming a nut support, a width of the nut support being greater than a width of the nut, the nut support including two side extensions presenting an L-shaped cross section.

9. A turbomachine comprising one balanced turbomachine part according to claim 1.

10. The balanced turbomachine part according to claim 1, wherein the mounting system includes two outgrowths extending radially inward on either side of the nut support, the outgrowths forming stops.

11. The balanced turbomachine part according to claim 10, wherein each nut includes a platen including an aperture corresponding to the through hole at the nut location, a first face which abuts the nut support when the nut is positioning on the mounting system, and a second face including side edges which rest on the side extensions of the nut support.

12. The balanced turbomachine part according to claim 11, wherein the aperture of the nut is extending by a sleeve that extends substantially perpendicular to the second face of the platen.

13. The balanced turbomachine part according to claim 1, wherein the screws include a first screw and a second screw, a mass of the first screw being different than a mass of the second screw.

* * * * *